(12) United States Patent
Born et al.

(10) Patent No.: US 6,361,643 B2
(45) Date of Patent: Mar. 26, 2002

(54) METHOD FOR REDUCING MECHANICAL VIBRATION IN METAL CONSTRUCTIONS

(75) Inventors: Peter Born; Hubert Schenkel, both of Sandhausen (DE)

(73) Assignee: Henkel Teroson GmbH, Heidelberg (DE)

(*) Notice: Subject to any disclaimer, the term of this patent is extended or adjusted under 35 U.S.C. 154(b) by 0 days.

(21) Appl. No.: 09/770,789

(22) Filed: Jan. 26, 2001

Related U.S. Application Data

(63) Continuation of application No. 08/836,970, filed on May 22, 1997, now abandoned.

(30) Foreign Application Priority Data

Nov. 23, 1994 (DE) .......................... 44 41 656

(51) Int. Cl.⁷ .................................. C09J 5/02
(52) U.S. Cl. .................. 156/307.3; 156/334; 525/236; 525/332.5
(58) Field of Search ............... 156/307.3, 334

(56) References Cited

U.S. PATENT DOCUMENTS

| | | | |
|---|---|---|---|
| 3,079,277 A | * 2/1963 | Painter ....................... 428/114 |
| 3,607,981 A | 9/1971 | Morris |
| 3,627,856 A | 12/1971 | Thienot |
| 3,855,177 A | 12/1974 | Sanda, Jr. |
| 4,626,568 A | 12/1986 | Sato et al. |
| 5,227,592 A | 7/1993 | Kösters et al. |
| 5,259,908 A | * 11/1993 | Buecken ..................... 156/334 |
| 5,356,994 A | 10/1994 | Koch |
| 5,403,623 A | 4/1995 | Kösters et al. |
| 5,989,712 A | * 11/1999 | Grimberg ................. 156/307.3 |

FOREIGN PATENT DOCUMENTS

| | | |
|---|---|---|
| CA | 1 248 271 | 1/1989 |
| CA | 2 000 569 | 4/1990 |
| CA | 1 305 806 | 7/1992 |
| CA | 1 335 220 | 4/1995 |
| CA | 1 338 274 | 4/1996 |
| DE | 34 44 863 | 7/1986 |
| DE | 38 34 818 | 11/1989 |
| DE | 40 13 318 | 10/1991 |
| DE | 41 20 502 | 12/1992 |
| DE | 41 22 849 | 1/1993 |
| EP | 097 394 | 1/1984 |
| EP | 181 441 | 5/1986 |
| EP | 309 903 | 4/1989 |
| EP | 309 904 | 4/1989 |
| EP | 356 715 | 3/1990 |
| EP | 0 358 598 | 3/1990 |
| EP | 0 658 597 | 6/1995 |
| JP | 57 139 132 | 8/1982 |
| JP | 58 047 032 | 3/1983 |
| JP | 01 006 062 | 1/1989 |

OTHER PUBLICATIONS

DIN 53440 (Jan. 1984).

* cited by examiner

*Primary Examiner*—Christopher Henderson
(74) *Attorney, Agent, or Firm*—Wayne C. Jaeschke; Stephen D. Harper; Michael E. Carmen

(57) ABSTRACT

One-component, heat-curing reactive compositions based on liquid rubbers containing reactive olefinic double bonds and optionally solid rubbers and vulcanization systems based on sulfur have high maxima of the acoustic loss factor over a broad in-use temperature range of around +10° C. to +40° C. in their vulcanized state. These compositions optionally contain fine-particle thermoplastic polymers as an additional component. The compositions are suitable for use as acoustically damping adhesives, sealing compounds or coating compositions.

23 Claims, 1 Drawing Sheet

METHOD FOR REDUCING MECHANICAL VIBRATION IN METAL CONSTRUCTIONS

CROSS REFERENCE TO RELATED APPLICATIONS

This application is a continuation of U.S. application Ser. No. 08/836,970, filed May 22, 1997, now abandoned, which claims priority under 35 U.S.C. §371 of PCT International Application Number PCT/EP95/04467, filed Nov. 14, 1995, which claims priority to German Application Number DE 44 41 656.3 filed Nov. 23, 1994.

BACKGROUND OF THE INVENTION

1. Technical Field

This invention relates to heat-curing reactive compositions based on natural and/or synthetic elastomers containing olefinic double bonds and vulcanizing agents which have acoustic damping properties in the vulcanized state. The invention also relates to a process for the production of these compositions and to their use as adhesives, sealing compounds and coatings.

2. Background of the Invention

Nowadays, motor vehicles, machines and appliances are made almost exclusively from very thin metal sheets. Mechanically moving parts or running engines unavoidably cause these thin sheets to vibrate—often in the hearing range of the human ear. These vibrations are propagated in the form of mechanical vibration throughout the entire vehicle, machine or appliance and can be radiated into the air as troublesome noise at remote places. Accordingly, to reduce sound radiation and vibration damping, these sheets are provided with noise-damping coatings, so-called anti-vibration coatings, especially in automobile manufacture and in the manufacture of domestic appliances.

The conventional procedure adopted for this purpose is to extrude mixtures of fillers of high specific gravity and bitumen to form films from which the corresponding shaped parts are then stamped or cut. These films are then bonded to the metal sheets in question, optionally having to be adapted to the shape thereof by heating. Although these bitumen films are still frequently used by virtue of their low material price, they are extremely brittle and tend to flake off the metal sheet, particularly at low temperatures. The frequently proposed additions of elastomers also produce only a slight improvement which is inadequate for many applications. In addition, preformed bitumen parts cannot be applied to intricately shaped or awkwardly situated sheet metal parts of machines or vehicles, for example the inside surfaces of doors. Another disadvantage is that, in many cases, several stamped parts are required for a single vehicle or appliance and, accordingly, have to be expensively stored in appropriate numbers.

Accordingly, attempts have been made to eliminate the disadvantages of bitumen films by using other polymer systems. For example, filler-containing aqueous polymer dispersions of polyvinyl acetate or ethylene/vinyl acetate copolymers have been developed and can be sprayed onto the sheet metal parts in the necessary layer thickness. Unfortunately, systems such as these are a disadvantage for use on an industrial scale where large numbers are always involved because the water cannot be removed quickly enough from the layer applied by spraying, particularly in considerable. layer thicknesses. Another disadvantage of these conventional noise-damping methods is that the materials in question serve the sole purpose of damping noise.

In the manufacture of vehicles, machines and appliances, efforts are now being made to simplify the complexity of the production processes and hence to reduce manufacturing costs.

In addition, adhesives, sealing compounds and coatings are used in the manufacture of vehicles, machines and appliances. Hitherto, the adhesives and/or sealing compounds have been mainly selected for their primary properties:

strength, i.e. shear strength, peel strength
elongation at break, flexibility
resistance to ageing
simple handling.

In the case of coatings, particularly underseal coatings, abrasion resistance is another selection criterion.

Numerous efforts have been made to reduce the complexity of the manufacture of vehicles, machines and appliances and hence to reduce manufacturing costs. Accordingly, there is a need for "multifunctional products", i.e. for example there is a need for adhesives, sealing compounds and/or coatings which, besides their main function, are capable of solving additional problems.

EP-A-358 598 and DE-A-3 444 863 describe plastisol formulations which perform the dual function of undersealing (protection against abrasion) and acoustic damping. DE-A-4 013 318 describes a two-layer undersealing compound which performs the function of undersealing and absorbing the noise emanating from impacting particles (stones, chippings, water, etc.). Although these products/processes perform the dual function of undersealing and noise damping extremely satisfactorily, there is mainly a need to combine the function of an adhesive and/or sealing compound with noise damping. This is particularly desirable for those parts of an automobile, a machine or an appliance which do not require any protection against abrasion, such as for example the trunk lid, the hood, the doors or the end wall of a vehicle.

Adhesives and sealing compounds for these parts are normally applied at an early stage of the production process known as "shell construction". The metal sheets used are covered with anti-corrosion oils and drawing oils in thicknesses of several grams per m², so that the adhesive/sealing compound used has to be able to absorb these oils. Although plastisols, particularly PVC plastisols, are used in shell construction, the plastisols disclosed in EP-A-358 598 or DE-A-3 444 863 are not suitable as adhesives/sealing compounds for shell construction. Plastisol formulations which have been specifically developed for shell construction have only minimal noise-damping properties, if any.

Another group of adhesive/sealing compounds suitable for use in shell construction is based on rubbers, more particularly vulcanizable compositions based on 1,4-polybutadienes and/or 1,4-polyisoprenes. These compositions preferably contain liquid polydienes of low molecular weight, sulfur and optionally accelerators for sulfur vulcanization. In addition, these compositions may contain high molecular weight, so-called solid rubber, both the liquid polydienes and/or the solid rubber optionally containing functional groups such as, for example, hydroxyl groups, carboxyl groups, anhydride groups or epoxy groups. This group of rubber-based adhesive/sealing compounds is described in a number of patent applications, for example EP-A-97 394, EP-A-309 903, EP-A-309 904, DE-A-3 834 818, DE-A-4 120 502, DE-A-4 122 849, EP-A-181 441 and EP-A-356 715.

It is apparent from DE-A-4 122 849 that the object of bonding metal sheets in the construction of automobile shells is inter alia to damp any vibration occurring. Although the document in question does not provide any particulars in this regard, it may be assumed that the vibrations in question are low-frequency vibrations outside the range of hearing of the human ear, such as for example the vibrations of hood trunk lids and doors where they have no suitable reinforcing frames ("antiflutter adhesives").

EP-A-181 441 describes two-component, thermally crosslinkable compositions and processes for the production of cold-crosslinking compositions, one binder containing hydroxyl groups and the second binder containing carboxylic acid groups or anhydride groups. The two components have to be mixed immediately on application, curing taking place either by heating with ester formation between the hydroxyl groups and the carboxylic acid groups or in the cold, in which case catalysts have to be added. According to the document in question, the compositions may be used inter alia as vibration damping compositions or noise damping compositions. The document does not provide any further particulars, particularly in regard to the effectiveness of damping or the substrates which are to be damped.

Hitherto unpublished European patent application 93 120 384.8 describes the use of 3,4-polyisoprene in combination with other curable or non-curable liquid and/or solid rubbers and the use of these compositions for one-component, hot-vulcanizable adhesive/sealing compounds with acoustic damping properties.

SUMMARY

It has been found that one-component, heat-curing (vulcanizable) adhesive/sealing compounds based on liquid rubbers and optionally solid rubbers can be modified in such a way that there is no need to use the difficult-to-obtain 3,4-polyisoprene, in spite of which extremely effective acoustic damping is obtained with these compositions.

In the context of the present invention, acoustic damping or vibration damping is understood to be the damping of mechanical vibration which is known to reduce the vibration of sheet metal constructions.

BRIEF DESCRIPTION OF THE DRAWING

A more complete understanding of the present invention will become readily apparent from the following description together with FIG. 1 which is a graph showing acoustic damping as a function of temperature for three embodiments of the invention and a control.

DETAILED DESCRIPTION OF THE INVENTION

Figure 1:
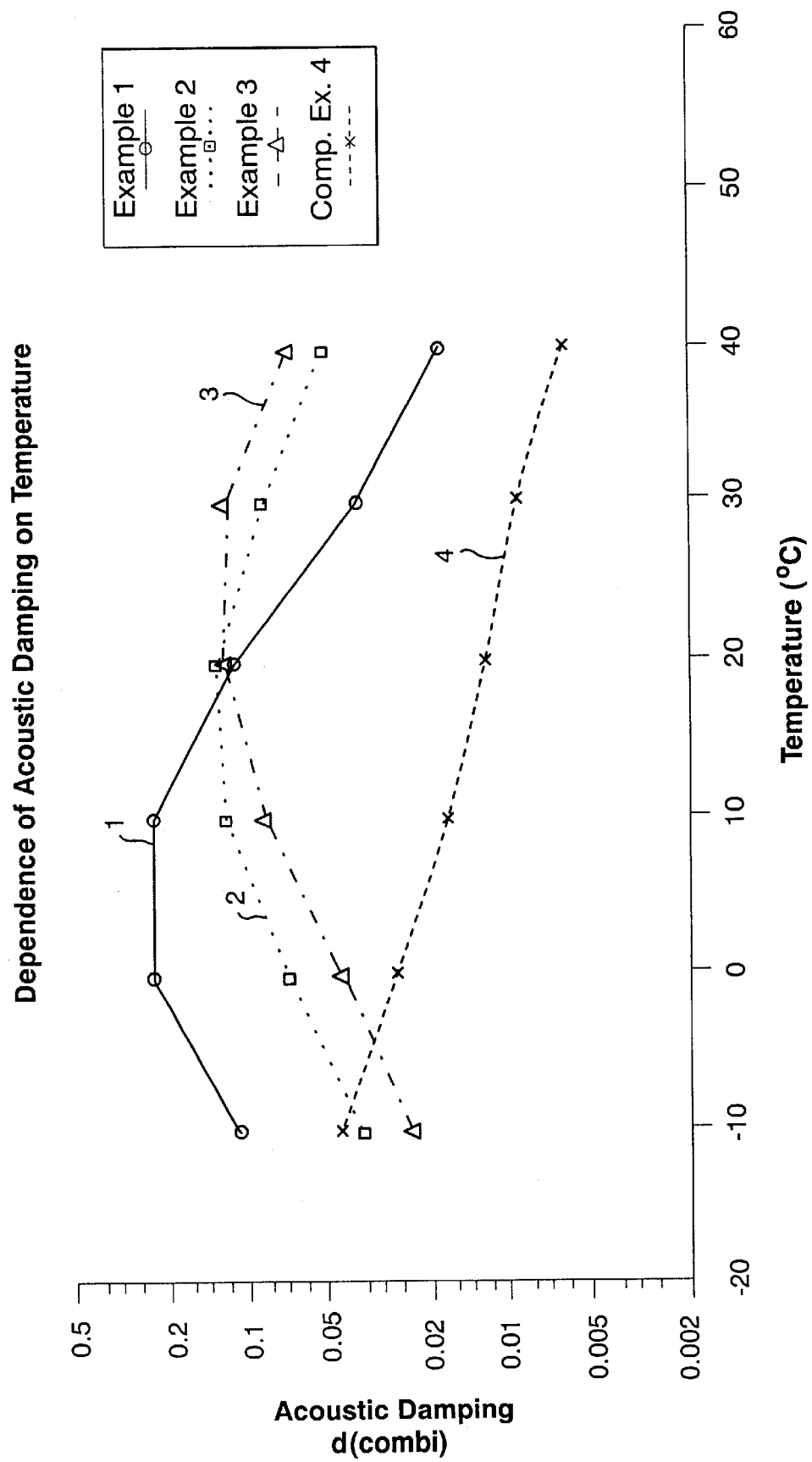

The effectiveness of the acoustic damping properties of the compositions according to the invention is evaluated by the flexural fatigue test according to Part 3 of DIN 53440. To this end, steel plates are coated with the compositions according to the invention and the coating thus applied is cured under temperature conditions such as prevail, for example, in car manufacture for curing the various paint systems, i.e. at temperatures in the range from 130° C. to 220° C. The flexural fatigue test is then carried out at 200 Hz and at various temperatures to be able to evaluate the effective acoustic damping effect of these compositions in the "in-use temperature range", i.e. between about 0° C. and +40° C. Any heat-curing (vulcanizable) compositions which, in the flexural fatigue test according to DIN 53440, Part 3, show extremely high damping, i.e. a loss factor of the coated sheet metal strip d(combi) of >0.1 and preferably 0.2 or more count as acoustically effective in the context of the present invention.

The compositions according to the invention contain at least one of the following substances:
- one or more liquid rubbers and/or solid rubbers or elastomers
- thermoplastic polymers in the form of fine-particle powders
- fillers
- tackifiers and/or coupling agents
- extender oils
- vulcanizing agents, vulcanization accelerators, catalysts
- antiagers
- flow aids.

Liquid rubbers or elastomers may be selected from the following group of homopolymers and/or copolymers: polybutadienes, more particularly 1,4- and 1,2-polybutadienes, polybutenes, polyisobutylenes, 1,4-polyisoprenes, styrene/butadiene copolymers, butadiene/acrylonitrile copolymers, these polymers optionally containing terminal and/or (statistically distributed) lateral functional groups. Examples of such functional groups are hydroxy, carboxyl, carboxylic anhydride or epoxy groups. The molecular weight of these liquid rubbers is typically below 20,000 and preferably in the range from 900 to 10,000. The percentage content of liquid rubber in the composition as a whole is determined by the required rheology of the uncured composition and by the required mechanical and acoustic damping properties of the cured composition. The percentage content of liquid rubber or elastomer normally varies between 5 and 50% by weight of the formulation as a whole.

Suitable solid rubbers or elastomers normally have a significantly higher molecular weight than the liquid rubbers (100,000 or higher). Examples of suitable rubbers are polybutadiene, preferably with a very high percentage content of 1,4-cis-double bonds (typically above 95%), styrene/butadiene rubber, butadiene/acrylonitrile rubber, synthetic or natural isoprene rubber, butyl rubber or polyurethane rubber.

The addition of fine-particle thermoplastic polymer powders can produce a significant improvement in the acoustic damping effect providing the thermoplastic polymer has a glass transition temperature in the range from 5° C. to 50° C. Examples of suitable thermoplastic polymers are polypropylene, polyethylene, thermoplastic polyurethanes, methacrylate copolymers, styrene copolymers, polyvinyl chloride, polyvinyl acetal and, in particular, polyvinyl acetate and copolymers thereof.

The fillers may be selected from a number of materials, including in particular chalks, natural ground or precipitated calcium carbonates, calcium magnesium carbonates, silicates, heavy spar and carbon black. Lamellar fillers, for example vermiculite, mica, talcum or similar layer silicates, are also particularly suitable. In some formulations, lamellar fillers have significantly improved the acoustic damping effect. It may be advisable to subject the fillers to an at least partial surface pretreatment, coating with stearic acid having proved to be particularly useful in the case of the various calcium carbonates or chalks. The total filler content of the formulation can vary between 10 and 70% by weight and is preferably between 25 and 60% by weight.

Suitable tackifiers and/or coupling agents are hydrocarbon resins, phenolic resins, terpene/phenol resins, resorcinol resins or derivatives thereof, modified or unmodified resinic acids and esters (abietic acid derivatives), polyamines, polyaminoamides, polyepoxy resins, anhydrides and anhydride-containing copolymers. The type and quantity of tackifier or coupling agent is determined by the polymer composition of the adhesive/sealing compound or by the coating composition, by the strength of the cured composition and by the substrate to which the composition is applied. Typical tackifying resins (tackifiers), such as for example, the terpene/phenol resins or resinic acid derivatives, are normally used in concentrations of 5 to 20% by weight while typical coupling agents, such as polyamines, polyaminoamides or resorcinol derivatives, are typically used in concentrations of 0.1 to 10% by weight.

The compositions according to the invention are preferably free from plasticizers, more particularly phthalic acid esters or extender oils. However, it may be necessary to influence the rheology of the uncured composition and/or the mechanical properties and/or the acoustic damping effect of the cured. compositions by the addition of so-called extender oils, i.e. aliphatic, aromatic or naphthenic oils. However, this is preferably done by the addition of low molecular weight polybutenes, polyisobutylenes or by the use of low molecular weight liquid rubbers. If extender oils are used, they are used in quantities of 5 to 20%.

Suitable curing agents or vulcanizing agents, accelerators or catalysts are determined by the reactive and/or functional groups of the polymers selected. Radical vulcanization systems, more particularly based on organic or inorganic peroxides, vulcanization systems based on sulfur, more particularly in combination with organic vulcanization accelerators and optionally zinc compounds, are suitable for the curing reaction via the olefinic double bonds (vulcanization) of the liquid and/or solid rubbers, although vulcanization systems of quinones, dioximes or dinitrosobenzene are also suitable.

Particularly preferred vulcanization systems are those based on powder-form sulfur, particularly in combination with vulcanization accelerators, such as for example mercaptobenzothiazole, dithiocarbamates, sulfenamides, disulfides, such as for example dibenzothiazole disulfide and/or thiuram disulfides, aldehyde/amine accelerators, guanidines and metal oxides, such as zinc oxide for example. Typical rubber vulcanization auxiliaries, for example fatty acids (for example stearic acid), may be additionally present in the formulation. The sulfur content may vary within wide limits and may be up to 5% by weight and preferably up to about 10% by weight, the lower limit preferably not being below 3% by weight. The sulfur content depends on the reactivity of the rubbers used, more particularly the liquid rubbers. In addition, the maximum loss factor and the useful temperature range for a sufficiently high loss factor can be influenced through the sulfur content. The content of vulcanization accelerators may vary between 0 and around 10% by weight. The content of metal oxides is also between 0 and 10% by weight.

Particularly suitable sulfur-free vulcanization systems are vulcanization systems based on p-benzoquinone dioxime which may additionally contain the above-mentioned vulcanization accelerators and/or metal compounds in the quantity ranges mentioned above.

The compositions according to the invention may contain conventional stabilizers against thermal, thermo-oxidative or ozone degradation, for example sterically hindered phenols or amine derivatives, in quantities of—typically—0.1 to 5% by weight.

Although the rheology of the compositions according to the invention can normally be brought into the required range through the choice of the fillers and the quantity ratio of the low molecular weight liquid rubbers, conventional flow aids, for example pyrogenic silicas, Bentones or fib-rillated or pulp chopped fibers, may be used in quantities of 0.1 to 7%. In addition, other conventional auxiliaries and additives may be used in the compositions according to the invention.

The acoustic damping effectiveness of the composition according to the invention can be influenced towards the specific needs of the application in regard to the position of the maximum of the loss factor and the temperature range in which extremely effective acoustic damping is achieved. The main influencing factors in this regard are the vulcanization system (sulfur content, vulcanization accelerator content) and the content and reactivity of rubbers, particularly liquid rubbers. As already mentioned, an addition of suitable thermoplastic polymer powders can positively influence both the maximum and the temperature range for effective acoustic damping. To a certain extent, the choice of the type and quantity of fillers can also influence the acoustic properties. It has been found in this regard that lamellar fillers in particular, such as mica for example, have a favorable effect on the loss factor. In addition, the loss factor can be influenced by the thickness of the coating. It is known that foamed materials produce a higher loss factor although this cannot be applied in cases where the adhesive is required to show high tensile shear strength. In most applications, it is desirable for the maximum of the loss factor to be at around room temperature (around 20° C.) and for the effective damping range (loss factor >0.1) to extend over as broad a temperature range as possible. The curing conditions for the adhesive/sealing or coating compositions according to the present invention may be adapted to the particular application. As mentioned at the beginning, a preferred application is shell construction in the automotive industry so that the compositions should cure in 10 to 35 minutes at a temperature of 80° C. to 240° C., temperatures in the range from 160 to 200° C. preferably being applied in shell construction. A crucial advantage of the compositions according to the invention over known plastisols is their so-called "wash resistance" immediately after application of the adhesives, i.e. they do not require pregelation like the plastisols to be able to withstand the various washing and phosphating baths used in shell construction. The following Examples are intended to illustrate the invention without limiting its scope in any way.

In the Examples, the acoustic damping property of the compositions was determined by the "Oberst" method described in DIN 53440, Part 3, using coated steel strips. The coating was cured in a conventional laboratory drying cabinet. Unless otherwise indicated, all parts in the following Examples are parts by weight.

EXAMPLES

|  | Example 1 | Example 2 | Example 3 | Example 4 |
|---|---|---|---|---|
| Cis-1,4-polyisoprene | 10.0 | | | |
| Polybutadiene, solid (1) | | 5.0 | 3.0 | 3.0 |
| Polybutadiene, liquid (2) | | 5.0 | 18.0 | |
| Polybutadiene, liquid (3) | | 15.0 | 9.0 | 23.0 |
| Polybutadiene, liquid (4) | 20.0 | | | |
| Polybutadiene, liquid (5) | 10.0 | | | |
| Polybutadiene, liquid (6) | | 5.0 | 9.0 | |
| Polybutadiene, liquid (7) | | | | 7.0 |
| Zinc oxide, active | 4.0 | 4.0 | 4.0 | 4.0 |
| Sulfur, powder | 4.0 | 5.0 | 5.0 | 4.0 |
| Dibenzothiazyl disulfide (MBTS) | 4.0 | 5.0 | 5.0 | |
| Tetramethyl thiuram | 1.5 | | | |

-continued

|  | Example 1 | Example 2 | Example 3 | Example 4 |
|---|---|---|---|---|
| disulfide (TMTD) |  |  |  |  |
| Diphenyl guanide (DPG) |  |  |  | 3.0 |
| Polyvinyl acetate, powder (8) |  | 10.0 |  |  |
| Calcium carbonate | 20.0 | 43.0 | 44.0 | 50.0 |
| Calcium oxide | 5.5 | 2.5 | 2.5 | 5.0 |
| Mica | 20.0 |  |  |  |
| Antioxidant | 0.5 | 0.5 | 0.5 | 0.5 |
| Carbon black | 0.5 |  |  | 0.5 |

(1) Cis-1,4- at least 98%
(2) MW approx. 1800, vinyl approx. 40–50%
(3) MW approx. 1800, cis-1,4 approx. 72%
(4) MW approx. 1000, vinyl approx. 40–50%
(5) MW approx. 900, trans-1,4 approx. 30–40%
(6) Polybutadiene/maleic anhydride adduct, MW approx. 1700
(7) Polybutadiene containing terminal OH groups, MW approx. 2800
(8) EVA copolymer, Tg approx. 23° C.

Acoustic damping properties 1 mm thick spring steel strips measuring 240 mm×10 mm were coated over a length of 200 mm with a layer of the products of Examples 1 to 3 and Comparison Example 4, after which the coatings were cured for 30 minutes at 180° C. The acoustic damping value (d-combi) was determined by the flexural fatigue test according to DIN 53440, Part 3, at 200 Hz. The coating weight was standardized to 50%, i.e. the weight of the coating with the acoustically damping adhesive/sealing compound was 50of the weight of the metal strip.

Comparison Example 4 shows in particular that, without an adequate supply of reactive rubber, the sulfur content of >3% and the accelerator content do not lead to the crosslinking according to the invention or, hence, to effective acoustic damping.

What is claimed is:

1. A method for reducing mechanical vibration in metal constructions comprising the steps of:
    a) coating at least a portion of a surface of at least one metal article with an acoustic damping amount of a composition comprising:
        (i) about 3 to about 10% by weight of at least one solid rubber having a molecular weight of about 100,000 or higher;
        (ii) about 5 to about 50% by weight of at least one functional and/or nonfunctional liquid polyene having a molecular weight below about 20,000; and,
        (iii) a vulcanization system comprising sulfur in an amount of at least about 3%, based on the total weight of the composition;
    b) joining together the coated metal article with at least one other metal article; and,
    c) curing the coating composition.

2. The method of claim 1 wherein the solid rubber is selected from the group consisting of cis-1,4-polybutadiene, styrene/butadiene rubber, synthetic isoprene rubber, natural rubber, ethylene/propylene/diene rubber, nitrile rubber, butyl rubber, acrylate rubber and mixtures thereof.

3. The method of claim 1 wherein the liquid polyene is selected from the group consisting of 1,2-polybutadiene, 1,4-polybutadiene, polyisoprene, polybutene, polyisobutylene, copolymers of butadiene with styrene, copolymers of butadiene with acrylonitrile, copolymers of butadiene with styrene and acrylonitrile, copolymers of acrylates with dienes and mixtures thereof.

4. The method of claim 1 wherein the functional liquid polyene comprises functional groups selected from the group consisting of carboxyl groups, carboxylic anhydride groups, hydroxyl groups, amino groups, mercapto groups, epoxy groups and mixtures thereof.

5. The method of claim 4 wherein the functional liquid polyene further comprises up to 25% by weight of the functional groups.

6. The method of claim 1 wherein the vulcanization system further comprises a compound selected from the group consisting of organic accelerators, metal oxides and mixtures thereof.

7. The method of claim 1 wherein the composition further comprises about 10% to about 70% by weight of a filler.

8. The method of claim 1 wherein the composition further comprises a thermoplastic polymer selected from the group consisting of polyethylenes, polypropylenes, polyurethanes, methacrylate copolymers, styrene copolymers, polyvinyl chlorides, polyvinyl acetates, vinyl acetate copolymers and mixtures thereof.

9. The method of claim 1 wherein the coating is cured at a temperature from about 130° C. to about 220° C.

10. The method of claim 1 wherein the coating is cured for a time period from about 10 minutes to about 35 minutes.

11. The method of claim 1 wherein the cured coating composition possesses a maximum loss factor of at least about 0.1 in the temperature range of about 10° C. to about 40° C. according to DIN 53440 at 200 Hz.

12. The method of claim 1 wherein the cured coating composition possesses a maximum loss factor of at least about 0.2 in the temperature range of about 10° C. to about 40° C. according to DIN 53440 at 200 Hz.

13. A method for reducing mechanical vibration in metal constructions comprising the steps of:
    a) joining together a metal article with at least one other metal article;
    b) applying an acoustic damping amount of a coating composition between at least a portion of the joined metal articles, the composition comprising:
        (i) about 3 to about 10% by weight of at least one solid rubber having a molecular weight of about 100,000 or higher;
        (ii) about 5 to about 50% by weight of at least one functional and/or nonfunctional liquid polyene having a molecular weight below about 20,000; and,
        (iii) a vulcanization system comprising sulfur in an amount of at least about 3%, based on the total weight of the composition; and,
    c) curing the composition.

14. The method of claim 13 wherein the solid rubber is selected from the group consisting of cis-1,4-polybutadiene, styrene/butadiene rubber, synthetic isoprene rubber, natural rubber, ethylene/propylene/diene rubber, nitrile rubber, butyl rubber, acrylate rubber and mixtures thereof.

15. The method of claim 13 wherein the liquid polyene is selected from the group consisting of 1,2-polybutadiene, 1,4-polybutadiene, polyisoprene, polybutene, polyisobutylene, copolymers of butadiene with styrene, copolymers of butadiene with acrylonitrile, copolymers of butadiene with styrene and acrylonitrile, copolymers of acrylates with dienes and mixtures thereof.

16. The method of claim 13 wherein the functional liquid polyene comprises functional groups selected from the group consisting of carboxyl groups, carboxylic anhydride groups, hydroxyl groups, amino groups, mercapto groups, epoxy groups and mixtures thereof.

17. The method of claim 16 wherein the liquid polyene further comprises up to 25% by weight of the functional groups.

18. The method of claim 13 wherein the vulcanization system further comprises a compound selected from the group consisting of organic accelerators, metal oxides and mixtures thereof.

19. The method of claim 13 wherein the composition further comprises about 10% to about 70% by weight of a filler.

20. The method of claim 13 wherein the composition further comprises a thermoplastic polymer selected from the group consisting of polyethylenes, polypropylenes, polyurethanes, methacrylate copolymers, styrene copolymers, polyvinyl chlorides, polyvinyl acetates, vinyl acetate copolymers and mixtures thereof.

21. The method of claim 13 wherein the coating is cured at a temperature from about 130° C. to about 220° C.

22. The method of claim 13 wherein the coating is cured for a time period from about 10 minutes to about 35 minutes.

23. The method of claim 13 wherein the cured coating composition possesses a maximum loss factor of at least about 0.1 in the temperature range of about 10° C. to about 40° C. according to DIN 53440 at 200 Hz.

* * * * *